United States Patent
Porat

(10) Patent No.: US 8,307,484 B2
(45) Date of Patent: Nov. 13, 2012

(54) METHOD AND APPARATUS FOR OPERATION OF POOL CLEANER WITH INTEGRAL CHLORINE GENERATOR

(75) Inventor: Joseph Porat, Delray Beach, FL (US)

(73) Assignee: Aqua Products, Inc., Cedar Grove, NJ (US)

( * ) Notice: Subject to any disclaimer, the term of this patent is extended or adjusted under 35 U.S.C. 154(b) by 0 days.

(21) Appl. No.: 13/207,132

(22) Filed: Aug. 10, 2011

(65) Prior Publication Data

US 2011/0290707 A1 Dec. 1, 2011

Related U.S. Application Data

(63) Continuation of application No. 12/384,806, filed on Apr. 8, 2009, now Pat. No. 8,007,653, which is a continuation-in-part of application No. 10/942,158, filed on Sep. 15, 2004.

(51) Int. Cl.
  *E04H 4/16* (2006.01)
  *C25F 7/00* (2006.01)
  *C25B 1/26* (2006.01)

(52) U.S. Cl. ............... 15/1.7; 204/196.02; 204/228.1; 204/228.6; 204/229.4; 204/230.2; 204/230.3; 204/278.5; 204/672; 205/359; 205/411; 205/459; 205/473; 205/474; 205/556; 205/742; 205/743; 210/753; 210/754

(58) Field of Classification Search ............... 15/1.7; 204/196.02, 228.1, 228.6, 229.4, 278.5, 672; 205/359, 411, 459, 556, 742–743; 210/753–754
See application file for complete search history.

(56) References Cited

U.S. PATENT DOCUMENTS

| | | | |
|---|---|---|---|
| 327,894 A | 10/1966 | Whitaker |
| 335,154 A | 11/1967 | Oldershaw |
| 343,323 A | 3/1969 | Gelinas |
| 345,841 A | 7/1969 | Crane |
| 366,552 A | 5/1972 | Howard |
| 366,985 A | 6/1972 | Kirkham |
| 409,735 A | 6/1978 | Yates |
| 413,600 A | 1/1979 | Persson |
| 422,927 A | 10/1980 | Yates |
| 446,211 A | 7/1984 | Iwate |
| 472,405 A | 2/1988 | Collier |

(Continued)

OTHER PUBLICATIONS

Jandy Aqualine, "Electronic Chlorine Generator Manual" (35 pages).

(Continued)

*Primary Examiner* — Lois Zheng

(74) *Attorney, Agent, or Firm* — Abelman, Frayne & Schwab

(57) ABSTRACT

An automated self-propelled pool cleaner having a housing, a water pump for moving water through the housing, drive means for moving the pool cleaner over the surface of the salt water pool to be cleaned, and an integral electrochemical chlorine generator mounted in the housing, includes a processor/controller that is programmed to activate the chlorine generator, the pump and drive means in predetermined operational sequences that minimize wear and tear on the water pump and drive means, while at the same time distribute and maintain a safe level of sanitizing chlorine in the pool, to thereby obviate the need for an in-line chlorinator or other chemical additive treatments; an optional automated sensor device can be provided to activate a secondary maintenance program which enables the pool cleaner to operate over prolonged periods of time as the sole means for filtering and sanitizing the pool water. An electrochemical cell manual mounting system permits the cell to be secured in place for operation and manually removed for maintenance, repair or replacement by the user without special tools or training.

13 Claims, 7 Drawing Sheets

U.S. PATENT DOCUMENTS

| | | |
|---|---|---|
| 499,215 A | 2/1991 | Silveri |
| 5,725,761 A | 3/1998 | Phillips |
| 5,882,512 A | 3/1999 | Denkewicz |
| 6,039,886 A | 3/2000 | Henkin |
| 6,508,929 B1 | 1/2003 | Mercer |
| 6,798,184 B2 | 9/2004 | Honda |
| 6,842,931 B2 | 1/2005 | Porat |
| 6,942,766 B2 | 9/2005 | Lemke |
| 2005/0067300 A1 | 3/2005 | Tremblay |
| 2006/0053572 A1 | 3/2006 | Porat |
| 2007/0094817 A1 | 5/2007 | Stoltz |

OTHER PUBLICATIONS

Goldline Controls, "Electronic Chlorine Generator Technical Information" (6 pages).

Pool Plaza, "Pool School Brochure: Chlorine Feeders & How Does a Salt Water Pool System Work?" (5 pages).

Int'l Search Report, PCT/US10/01071 (Dated Aug. 5, 2010).

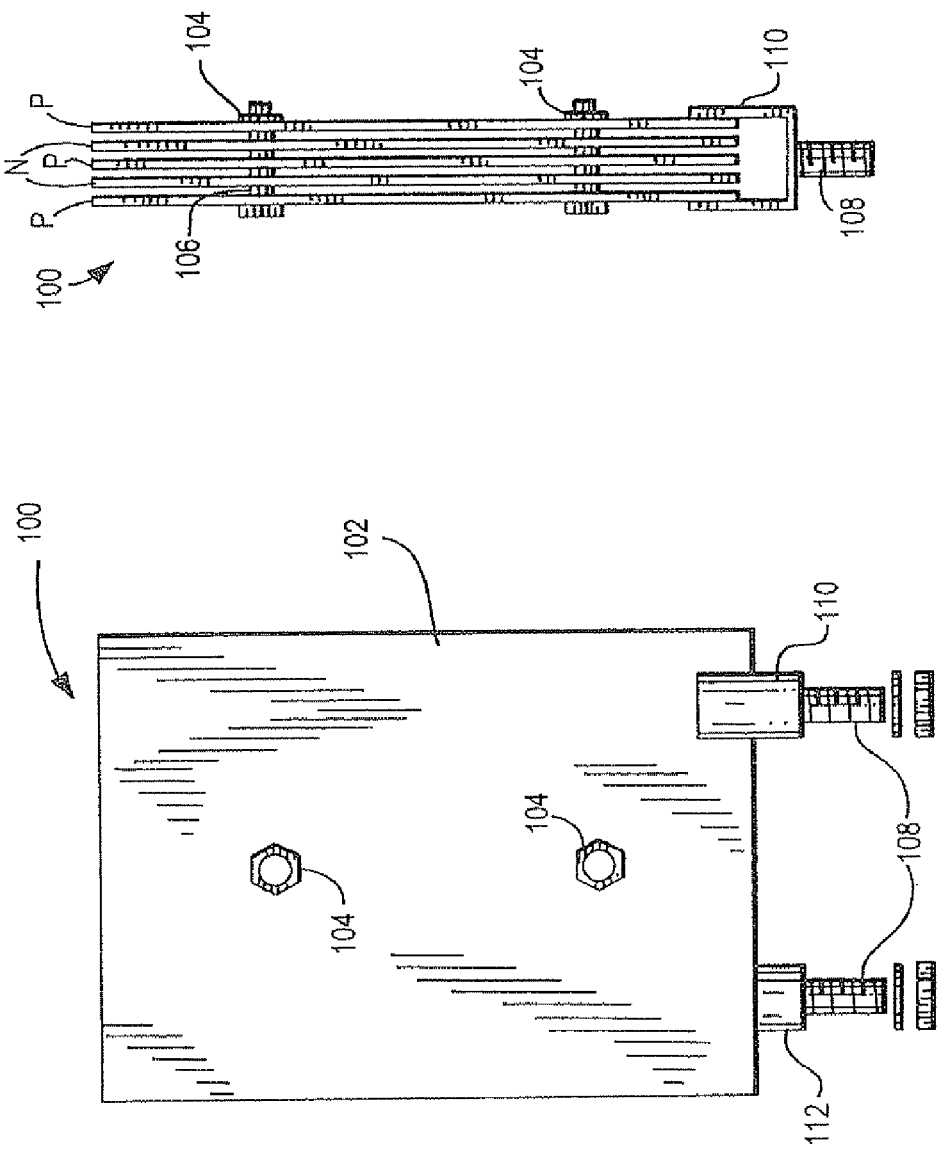

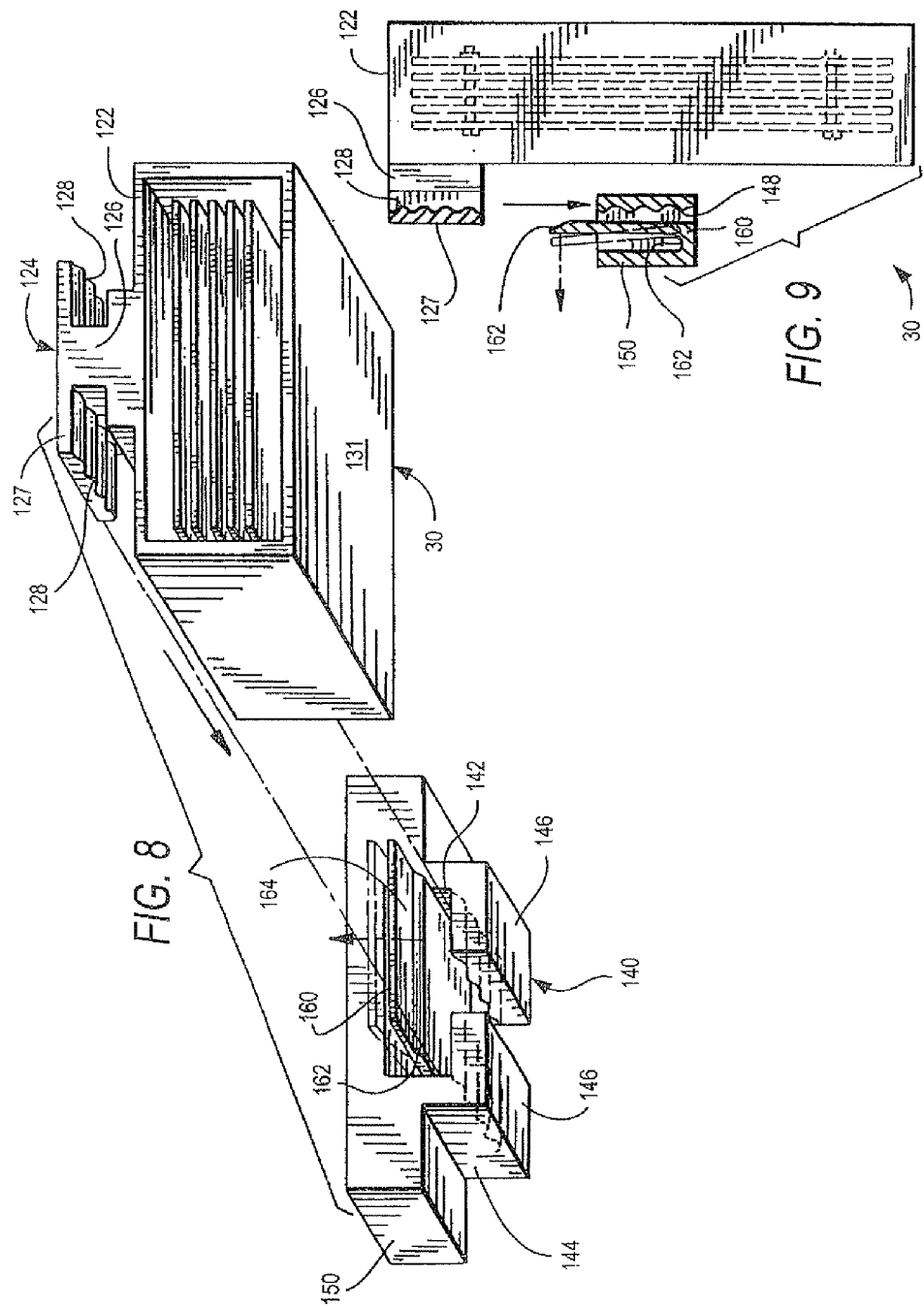

METHOD AND APPARATUS FOR OPERATION OF POOL CLEANER WITH INTEGRAL CHLORINE GENERATOR

CROSS-REFERENCE TO RELATED APPLICATIONS

This application is a continuation of U.S. Ser. No. 12/384,806 filed Apr. 8, 2009, now U.S. Pat. No. 8,007,653, which is a continuation-in-part of patent application Ser. No. 10/942,158, filed Sep. 15, 2004, the contents of which are incorporated herein by reference.

FIELD OF THE INVENTION

This invention relates to robotic, self-propelled pool cleaners having an integral on-board electrochemical chlorine generator. More particularly, this invention relates to an on-board electrochemical chlorine generator apparatus and method of operation that provides simultaneous biocidal sanitation and mechanical filtration to clean swimming pool water.

BACKGROUND OF THE INVENTION

Automated pool cleaners for mechanical cleaning of swimming pool water have been known for many years. Some of the early patents include U.S. Pat. No. 3,278,949 issued to Whitaker on Oct. 18, 1966; U.S. Pat. No. 3,433,237 issued to Gelinas on Mar. 18, 1969; and U.S. Pat. No. 3,665,525 issued to Howard on May 30, 1972.

U.S. Pat. No. 5,882,512 issued to Denkewicz et al. discloses an automatic pool cleaner comprising a removable chemical dispenser which carries solid chemicals such as silver-containing particles or other sanitizing solid pellets. The pool cleaner mechanically cleans the pool water while dispensing water-sanitizing chemical(s) by dissolving solid sanitizing chemical particles or pellets contained in the chemical dispenser inside the pool cleaner. The Denkewicz apparatus is mechanically complex as compared to the conventional pool cleaner thereby making it more expensive to manufacture, and likely to require maintenance and eventual repairs by technically trained personnel adding to the overall operating costs. Furthermore, the cost of operation includes the purchase of the dry chemicals which are consumed and must be replaced. A significant disadvantage of the Denkewicz apparatus is the safety hazard created when the machine is removed from the pool and highly concentrated chlorine-containing water drips onto the pool deck where it can be contacted by barefoot bathers.

The use of an electrochemical chlorine generator for sanitizing swimming pool water as the water passed through the main water filtration and circulation system of the pool has also been known for many years. These are commonly known as "in-line" chlorinators by those familiar with the art. Some early patents for electrolytic chlorinators for swimming pool water sanitation include U.S. Pat. No. 3,351,542 issued to Oldershaw, et al. on Nov. 7, 1967; U.S. Pat. No. 3,458,414 issued to Crane, et al. on Jul. 29, 1969; U.S. Pat. No. 3,669,857 issued to Kirkham, et al. on Jun. 13, 1972; and U.S. Pat. No. 4,724,059 issued to Collier on Feb. 9, 1988.

By way of background, a chlorine generator electrochemically produces biocidal chlorine to sanitize pool water through an electrolysis process. During the process, salt, i.e., sodium chloride, or NaCl, present in the water is consumed on the electrode and chlorine ($Cl_2$) is generated and quickly dissolves in the water. Thereafter, a disproportionation reaction takes place to convert the dissolved chlorine to hypochlorous acid and hypochlorite ions, which are the active chemicals for the sanitation of pool water.

The term "chlorine" is used in the description and claims that follow to mean the biocidally active forms generated by the electrochemical reaction and the disproportionation reaction described above.

Electrochemical chlorine generators, also referred to as chlorinators, are currently available from a number of commercial sources for use in establishing and maintaining bactericidal levels of chlorine in swimming pools. These in-line electrochemical chlorine generators are installed in-line with the main pumping and filter system outside of the pool. These devices are relatively expensive to purchase and require the services of an experienced plumber and an electrician for their proper installation. In an automated control system, a probe is immersed in the pool water system at a representative location and the probe electronically transmits a signal to a remote poolside power supply and associated controller/processor which, in turn, controls the periodic operation of the chlorine generator apparatus.

The terms "controller" and "controller/processor" are used interchangeably in the description and claims that follow and are intended to include such devices that are programmed by the manufacturer or distributor of the pool cleaner and those in which the programs can be selected by a technician or the user in order to adapt the operation and functioning of the pool cleaner of the invention to the particular conditions of the pool in which the pool cleaner is used.

The use of these permanently installed electrochemical generator systems is typically limited to larger commercial and institutional pools where the convenience associated with the essentially continuously controlled introduction of chlorine into the pool outweighs the initial costs. These devices also eliminate the need for the purchase of chemicals and either the use of maintenance personnel or automated chemical injection systems.

The initial capital outlay for the purchase of the equipment, as well as the expenses associated with installation by plumbers and electricians generally discourage the use of electrochemical chlorine generators for the residential pool market. However, saltwater electrochemical chlorinators do produce a highly effective bactericidal sanitizer from a mild saltwater solution that pool users generally find less objectionable than chlorine-producing chemicals typically used in residential pools.

An alternative electrochemical apparatus is disclosed in U.S. Pat. No. 4,992,156 issued to Silveri on Feb. 12, 1991, where the cell is attached to a wall of the pool above a circulating water outlet, and the movement of salt water through the cell is effected by gas lift, which is possible when the cell is directly exposed to a very large volume of water and is positioned proximate a piped pool water circulation system outlet. The gas lift, in combination with the piped circulation of the water, helps to dissipate the water in and around the cell into the adjacent bulk of pool water.

A principal disadvantage of the Silveri devices is the requirement to operate the pools water circulation pump in order to assure distribution of the chlorine generated. A typical pump motor operates at 20 amps and a significant amount of electrical power is consumed in moving the large volume of water during its operation.

Safety hazards associated with the build-up of chlorine require that power to the chlorine generator be interrupted if the pump stops.

It is therefore an object of the present invention to provide an apparatus for generating and distributing biocidal or bactericidal chlorine in pools and a method of operation that is essentially self-contained and the use of which requires no installation services by a plumber and requires no separate or specialized electrical power connections for its operation.

Another object of this invention is to provide an apparatus and method of operation that will prolong the useful life of a pool cleaner that is equipped with an electrochemical chlorine generator that serves as the sole means for sanitizing the water in a pool and maintaining the bacterial count at an acceptable level.

It is yet another object of the invention to provide an operational method and an apparatus for providing the desired concentration of chlorine by an electrochemical generator that relies on conventional chlorine test methods used for residential pools, thereby avoiding the necessity of using expensive electronic probes and data processing and transmission control systems.

A further object of the invention is to provide an apparatus and method for utilizing an electrochemical chlorine generator that efficiently and effectively distributes the chlorine throughout the volume of water in the pool in order to provide a uniform concentration of the desired chlorine and thereby avoid the localized high concentration regions associated with the apparatus and methods of the prior art.

A further object of the invention is to provide an electrochemical chlorine generating cell that can be easily and safely accessed and replaced by the owner or user of the pool cleaner without enlisting the aid of a trained technician.

Another object of the invention is to provide an automated system utilizing an electrochemical chlorine generator mounted on a robotic pool cleaner, the operation of the generator being controlled by signals derived from a submerged sampling probe and transmitted either directly or indirectly via a relay receiver/transmitter to the processor/controller on-board the pool cleaner.

Another object of the invention is to provide a chlorine monitoring system mounted inside or attached to the pool cleaner. The monitoring system generates an electrical or photoelectron signal which is proportional to the chlorine concentration in the monitored pool water. The signal is used as a feedback to control the level of the chlorine generation of the electrochemical chlorinator. The signal can be either directly tied to the controller IC board or sent via a wireless transmission device.

SUMMARY OF THE INVENTION

The above objects and other advantages are achieved by the method and apparatus of the present invention in which a robotic pool cleaner is combined with an integral electrochemical chlorine generator which produces and distributes sanitizing/bactericidal chlorine throughout the pool water as the cleaner moves across the pool surfaces during the normal periodic cleaning cycles, which can typically be one to two hours a day, and also during the much longer time intervals between the programmed cleaning cycles, e.g., 22 or 23 hours.

The present invention broadly comprehends an automated self-propelled pool cleaner having a housing, a water pump for moving water through the housing, drive means for moving the pool cleaner over the surface of the salt water pool to be cleaned and an integral electrochemical chlorine generated mounted in the housing, and includes a processor/controller that is programmed to activate the chlorine generator, the pump and drive means in predetermined operational sequences that minimize wear and tear on the water pump and drive means, while at the same time distribute and maintain a safe level of sanitizing chlorine in the pool, to thereby obviate the need for an in-line chlorinator or other chemical additive treatments; an optional automated sensor device can be provided to activate a secondary maintenance program which enables the pool cleaner to operate over prolonged periods of time as the sole means for filtering and sanitizing the pool water. A manual mounting system for the electrochemical cell permits the cell to be secured in place for operation and manually removed for maintenance, repair or replacement by the user without special tools or training.

More specifically, the improved apparatus of the invention comprehends an automated self-propelled pool cleaner having a housing, a pump for moving water through the housing, drive means for moving the pool cleaner over at least the bottom wall of a pool; an integral electrochemical chlorine generator positioned in said housing for producing bactericidal chlorine, the electrochemical generator comprising a plurality of negative and positive conductive plates arranged in a parallel spaced-part array to form a plurality of passageways, the array being positioned in the flow path of water moving through the housing; an outlet for discharging water containing bactericidal chlorine produced by the electrochemical generator into the water proximate the exterior of the pool cleaner housing; a source of electrical power operatively connected to the electrochemical chlorine generator; and programmable control means for initiating and terminating the operation of the chlorine generator, pump and drive means, the control means programmed for:

a. activating the water pump and the pool cleaner drive means to thereby move the pool cleaner across the surface of a wall of the pool to perform a programmed cleaning cycle;

b. initiating the operation of the chlorine generator to thereby produce bactericidal chlorine from a chloride-containing compound dissolved in the water during the cleaning cycle;

c. discharging bactericidal chlorine containing water from the pool cleaner housing in a turbulent flow to mix with the water in the pool;

d. deactivating the drive means and the water pump at the end of the cleaning cycle while maintaining the operation of the chlorine generator;

e. activating the water pump for intervals of several seconds every several minutes following the end of the cleaning cycle for a period of about one hour;

f. activating the drive means and pump for a period of time ranging from 2 to 4 minutes to thereby relocate the pool cleaner in the pool;

g. activating the water pump for intervals of several seconds every several minutes after the pool cleaner is relocated; and h. repeating steps (g) and (h) for a predetermined period of time.

Among the many advantages of the present invention achieved by combining an automatic pool cleaner with an electrochemical chlorine generator are a more homogeneous distribution of chlorine, more efficient use of chlorine and reduced or no external pool water pump circulation requirements.

The electrochemical environment inside an automatic pool cleaner is significantly different from that of an in-line chlorinator of the prior art. To appropriately combine an electrochemical chlorine generator and pool cleaner and make the integrated apparatus function in a safe, efficient and practical manner requires specialized operational protocols and functions different than those used with in-line chlorinators. In order to electrolytically generate chlorine safely and efficiently inside an automatic pool cleaner housing, significant accommodations must be made for the design and placement of the chlorinators and also to the mode of operation of the pool cleaner in which it is installed.

As a result of the electrochemical reactions, the salt water adjacent to the chlorinator cell must be replenished with fresh salt water; otherwise, the salt level in the cell will be reduced over time. There are two major problems associated with a low salt level. Firstly, the useful life of the precious metal-coated electrodes will be significantly shortened; secondly, the current efficiency will be significantly decreased with a corresponding loss of operational efficiency. By comparison, an in-line chlorinator is typically installed in-line with the main pump and filtration system and is located outside of the pool, and fresh saltwater is replenished to the electrodes created by the continuous operation of the main water circulation pump. Commercial in-line chlorinators have a flow sensor which is used to immediately switch off the cell if the water circulation flow stops.

Therefore, in accordance with the above electrochemical processes, it will be understood that the saltwater in, and adjacent to the chlorinator cell must be regularly refreshed and the chlorine and disproportionation reaction products constantly removed from the vicinity of the electrodes.

Automatic pool cleaners typically have an on-board water pump; however, the purpose of the pump in a pool cleaner is quite different from that used for an external in-line chlorinator. The pump in a pool cleaner generates a pressure/partial vacuum to create enough "lifting power" to move debris below the pool cleaner upwardly through the filter, which requires stronger intensity in an intermittent mode of operation. The typical pumping of water in a pool cleaner is therefore operated in an intermittent fashion with a relatively long pump idle time between each periodic cleaning of the pool. It is impractical to use the pool cleaner's pump for the continuous circulation in the same manner that the pool's main water circulation pump is used with an in-line chlorinator, because the pool cleaner's pump life will be significantly shortened. The invention also broadly comprehends a method of releasing bactericidal chlorine in the water of a swimming pool that contains a water-soluble chloride-containing chemical compound, the method comprising a. placing into the pool an automated, self-propelled pool cleaner having a housing, a water pump, drive means for moving the pool cleaner over the surface of the pool to be cleaned, an integral electrochemical chlorine generator mounted in the housing, and positioned in the flow path of water moving through the housing, a source of electrical power operatively connected to the electrochemical generator and control means for initiating and terminating the functioning of the chlorine generator;

b. activating the water pump and the pool cleaner drive means to thereby move the pool cleaner across the surface of a wall of the pool to perform a programmed cleaning cycle;

c. initiating the operation of the chlorine generator to thereby produce bactericidal chlorine from the chloride-containing compound dissolved in the water during the cleaning cycle;

d. discharging bactericidal chlorine containing water from the pool cleaner housing in a turbulent flow to mix with the water in the pool;

e. deactivating the drive means and the water pump at the end of the cleaning cycle while maintaining the operation of the chlorine generator;

f. activating the water pump for intervals of several seconds every several minutes following the end of the cleaning cycle for a period of about one hour;

g. activating the drive means and pump for a period of time ranging from 2 to 4 minutes to thereby relocate the pool cleaner in the pool;

h. activating the water pump for intervals of several seconds every several minutes after the pool cleaner is relocated; and i. repeating steps (g) and (h) for a predetermined period of time.

In accordance with the present invention, a pool cleaner and an electrochemical chlorinator are combined for use as the sole or principal water circulation and sterilization apparatus and system for the pool by utilizing a pre-programmed pump pulse sequence to assure proper functioning of the electrochemical process. The pre-programmed pump pulse sequence uses very short operational sequences during the pump's idle time. The operational sequence is programmed so that the time between the pulse pumping is short enough to assure that the salt solution concentration inside the cleaner does not drop to a hazardously low level. The relatively short time periods of pump operation during the pulse pumping assures that the pump will not suffer a significantly shortened useful life.

In accordance with the method of operation of the present invention, the chlorinator electrodes located inside the pool cleaner can be operated substantially continuously for periods of up to twenty-two hours during a twenty-four hour i.e., daily operational cycle. The electrochemical cell experiences an oscillation of salt concentration as compared to the exposure to a constant salt concentration of the prior art processes.

In one preferred embodiment, a pre-programmed pump operating sequence is employed in which the pool cleaner operates for approximately 90 minutes to complete a conventional filtration cleaning cycle while continuously generating chlorine. Following completion and termination of the cleaning cycle, the chlorinator remains on and the pump is initially turned off for about 3 minutes and then turned on for 3 seconds every 3 minutes for about one hour. The pump is turned on in order to change out the salt water solution inside the pool cleaner. This chlorination operational subsequence lasts for about one hour. After each hour, the drive and pump system is actuated for between 2 to 4 minutes in order to randomly move the pool cleaner to another location on the bottom of the pool before the subsequence is repeated. This process cycle continues until the end of the chlorination operational sequence which is also programmable for between 1-22 hours. Chlorination can also optionally continue during the time that the cleaner is being moved.

In another embodiment, the cleaning and chlorinating sequence is combined with a so-called "Watch-Dog" or maintenance operational mode in which the pool cleaner can be programmed for operation up to 24 hours a day in the pool water. The robotic cleaner is activated every 2 hours for 30 minutes and thereafter returns to a "sleep mode" for another 2 hours, after which the cycle is repeated. During these 30 minutes, the cleaner can produce biocidal chlorine or clean the swimming pool. In this mode of operation, the pool water is maintained in a clean condition and chlorinated. In this mode of operation, the pre-programmed pump and chlorination sequences can be coordinated with signals received from a chlorine sensor in contact with the pool water activates the generator when the chlorine concentration drops below a predetermined desired level, and interrupts power to the cell when the level is reached.

In another preferred embodiment, the pool cleaner operates in a pre-programmed mode designed to efficiently clean the entire bottom surface and, optionally, the side walls of the pool. The mode of operation during cleaning is not a part of the present invention, and any random or predetermined patterns known to the art for efficiently scanning the pool surfaces can be used. During the execution of the cleaning program, the on-board chlorine generator is activated until the desired concentration/level of chlorine in the pool water is attained. Once the desired value is reached, the operation of the electrochemical chlorine generator is terminated, and the pool cleaner continues its programmed cleaning operation.

In a further embodiment, after the cleaning program has been completed, or for other reasons it is not desirable to initiate the cleaning program, the automated pool cleaner is programmed to periodically move to a new location on the bottom of the pool to equalize the distribution of bactericidal chlorine in the pool water. The robotic pool cleaner's programming and mode of operation is adapted to assure that the cleaner with its on-board chlorine generator moves to distribute chlorine throughout the pool.

In another preferred embodiment, the pool cleaner is moved to a new location after about ten minutes, maintained in this position for about ten minutes and again moved to a new location. The chlorine is generated continuously during movement and while at each new location. As will be apparent to one of ordinary skill in the art from the above description and those that are provided below, the variety of combinations of operating times, patterns of movement, whether programmed or random, as well as the combinations of operation of the pool cleaner's components is not to be limited by the examples and specific embodiments provided.

In addition to the above fundamental electrochemical environment differences, there are other technical challenges and distinctions not found in operating the in-line chlorinators of the prior art. These include stray current corrosion, sometimes referred to as galvanic corrosion, which is an electrochemical process in which different types of metals are in the electrolyte, e.g., natural sea water and salt water prepared from salts containing compounds in addition to sodium chloride. When a chlorinator operates in such an environment, the current can induce the electrochemical corrosion of the metal parts inside the pool cleaner. To solve this problem, careful shielding of the electrodes is used to increase the total overall resistance environment of the chlorinator cell. Electrical insulation is applied to vulnerable metal parts as determined by need. For instance, an insulative, corrosion-resistant polymer powder coating can be applied to the metal parts located inside the robotic cleaner to obviate the corrosion problem.

Another technical problem that has been encountered is the formation of scale inside the pool cleaner when the chlorinator operates. The scale formed on the cell must be removed, since failure to do so will result in scaling so severe that the pool cleaner and/or the chlorinator can malfunction. In a preferred embodiment, ready access is provided to the chlorinator cell. In a particularly preferred embodiment, the cell is provided with a casing that is removable from its operative position inside the pool cleaner housing. The casing can be configured so that it engages a stationary mounting member in a close-fitting, but manually releasable relation. Alternatively, the casing and mounting member are provided with cooperating locking members that permit the casing and cell to be manually removed from the interior of the pool cleaner housing by a user without specialized tools or technical training. The user can then more easily clean the scale from the cell, e.g., using prescribed chemicals and simple tools in a safe and convenient environment.

In a particularly preferred embodiment, the chlorine generator is provided with a case in which it is securely, but removably mounted so that the user can perform routine maintenance, such as scale removal. The case is configured to accommodate the flow of water across the plates of the cell and includes exterior mounting means that releasably engage a cooperating mounting member or bracket affixed to the interior of the pool cleaner housing and/or a frame member that forms a portion of the interior structure of the pool cleaner. This arrangement provides the user with a manually-releasable cell mounting.

In an especially preferred embodiment of the invention, the unitary case containing the electrochemical chlorine generating cell can be accessed, detached from its mounting bracket(s), removed and returned to its operating position in the pool cleaner by the owner or user, without the assistance of a trained technician or other specialist. The ability to replace the cell easily and safely with a new or refurbished cell reduces the owner's maintenance and operating costs by avoiding on-site service charges customarily paid for such maintenance. On-site servicing by the user also eliminates the need to take the pool cleaner to a remote service provider, and the loss of use of the cleaner while waiting for the maintenance to be performed. For the typical residential pool owner, the capability for self-servicing of the pool cleaner's chlorine generating cell will represent a very attractive cost and time-saving feature. As such, it also provides a substantial commercial and competitive advantage to the manufacturer, marketers and retailers that sell the pool cleaner.

In one preferred embodiment of the invention, the pool cleaner is equipped with one or more rechargeable on-board batteries. The power requirements of the on-board computer processor/controller, the pump and the drive system are all within the operational capacity of commercially available batteries. Alternatively, a separate external power source can provide the power requirements to the pool cleaner via a conventional cable from a poolside power supply.

When the invention is employed in an automated, self-propelled pool cleaner that receives its power through a cable from a remote power supply, or transformer, typically located at a poolside, the electrochemical chlorine generator can also be powered by the same source. In this embodiment, the power supply can include a separate switch for stopping and starting the chlorine generator. Alternatively, two separate power supplies, one for the customary pool cleaner components, e.g., the water pump and the drive means, and the other for the chlorinator, can be used. In yet another embodiment, one power supply can be implemented and controlled by a switch mechanism so that it can be shared between the chlorinator and the pool cleaner components instead of using two batteries as the power supply. The switch mechanism can be one or more switches, and preferably includes at least three relays.

In the practice of the invention, the person responsible for maintaining the pool periodically checks the chlorine and pH levels in accordance with the standard procedures utilized for pool maintenance. When the chlorine concentration reaches the predetermined desired level, the operation of the on-board electrochemical generator is discontinued. Based upon a period of cyclic operation, the time required to attain the proper chlorine concentration in the pool will become known to the responsible individual. Assuming predictable weather patterns, including sunlight, rain and temperature range, the time of operation of the on-board chlorine generator required to provide the desired chlorine ion concentration can be predicted with reasonable certainty.

In a further preferred alternative embodiment, the processor/controller is programmable by the user to activate the chlorine generator for prescribed periods of time while the pool cleaner is in operation. As was discussed above, the individual responsible for maintenance of the pool will determine empirically, based on experience, the appropriate times and duration of operation during a predetermined period, such as a day. The control system also has a positive on/off switch so that the chlorine generator can be taken out of service in the event that the desired chlorine level is exceeded by the programmed operation.

In another preferred embodiment, a chlorine monitoring system is for convenience mounted inside the pool cleaner or attached outside to the cleaner. The chlorine monitoring system can be, for example, an N, N-diethyl-p-phenylene-diamine (DPD) based colorimetric system, an amperometric sensor method, or other appropriate device. The chlorine monitoring system generates electrical signals which are related to the concentration of free chlorine content in the pool water being monitored. The chlorine monitoring system periodically measures free chlorine levels in the pool water and generates signals which are used as the feedback transmitted either directly by hard wired connections, or through a wireless device to the IC board and computer processor of the pool cleaner controller. The feedback signals are used to control the operation of the chlorine production of the on-board electrochemical generator mounted inside the cleaner. This automatic chlorine monitoring and production automatic control system provides a totally automated apparatus and system which does not require frequent human intervention to maintain a constant residual chlorine level in the pool water and thus minimizes the human attention and also avoids human errors and serves to keep the pool water at its optimum quality.

The method and apparatus of the invention can also be used with a robotic pool cleaner that utilizes a remote pump and filter that draws water through a hose or conduit. Appropriate means for controlling the operation of the water pump include electrically wired and wireless control circuits that carry signals originating with the programmable controller. Such remote water pump and filtration systems are well known to those of ordinary skill in the art.

In another preferred embodiment, a robotic pool cleaner having an internal water pump and an associated discharge conduit is provided with an electricity-generating dynamo powered by a water turbine positioned in the stream discharged from the water pump, the electrical energy derived from the dynamo being utilized to provide some or all of the power required by the electrochemical chlorine generator to produce chlorine ions that are distributed to the surrounding water in the pool. In order to avoid disabling the turbine, water passing its blades should be free of debris.

The water turbine of the dynamo is preferably positioned for rotation in the flow path of the water stream discharged from the pump that draws the pool water and debris through the cleaner's filter system. Alternatively, the turbine can be positioned between the filter and the intake or upstream side of the pump.

In the embodiment employing a water turbine as the source of electrical power to the electrochemical chlorine generator, the turbine impeller is preferably placed with its axis of rotation in line with the water discharged from the pump. The electrical energy generated by the dynamo is delivered to the electrochemical chlorine generator. The chlorine is mixed with, and discharged from the interior of the pool cleaner housing with the water drawn through the filter and is thereby distributed throughout the water in the vicinity of the pool cleaner by the turbulent movement of the discharge.

BRIEF DESCRIPTION OF THE DRAWINGS

The invention will be further described below and with reference to the attached drawings where the same or similar elements are identified by the same numerals, and in which:

FIG. 3 is a front elevation view of an on-board electrochemical chlorine generator;

FIG. 4 is a side elevation view of the device of FIG. 3;

FIG. 8 is a perspective view of an electrochemical generator cell assembly in a mounting case positioned proximate a mounting bracket;

FIG. 9 is a view similar to that of FIG. 8 showing the case securely mounted in the bracket.

DETAILED DESCRIPTION OF THE PREFERRED EMBODIMENTS

Figure 1A:
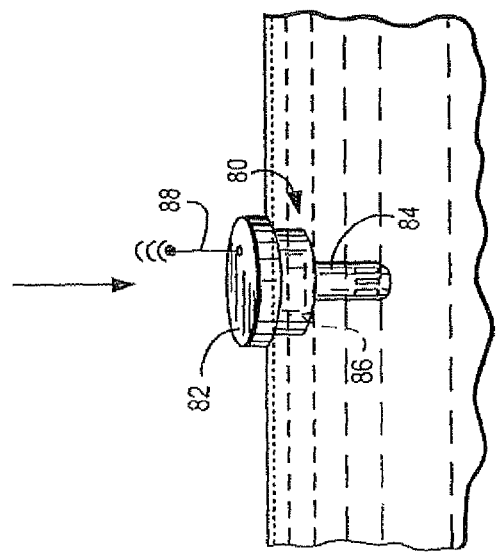
FIG. 1A is a perspective view of a floating analytical probe for use with the pool cleaner and ancillary power supply of FIG. 1.
Figure 1:
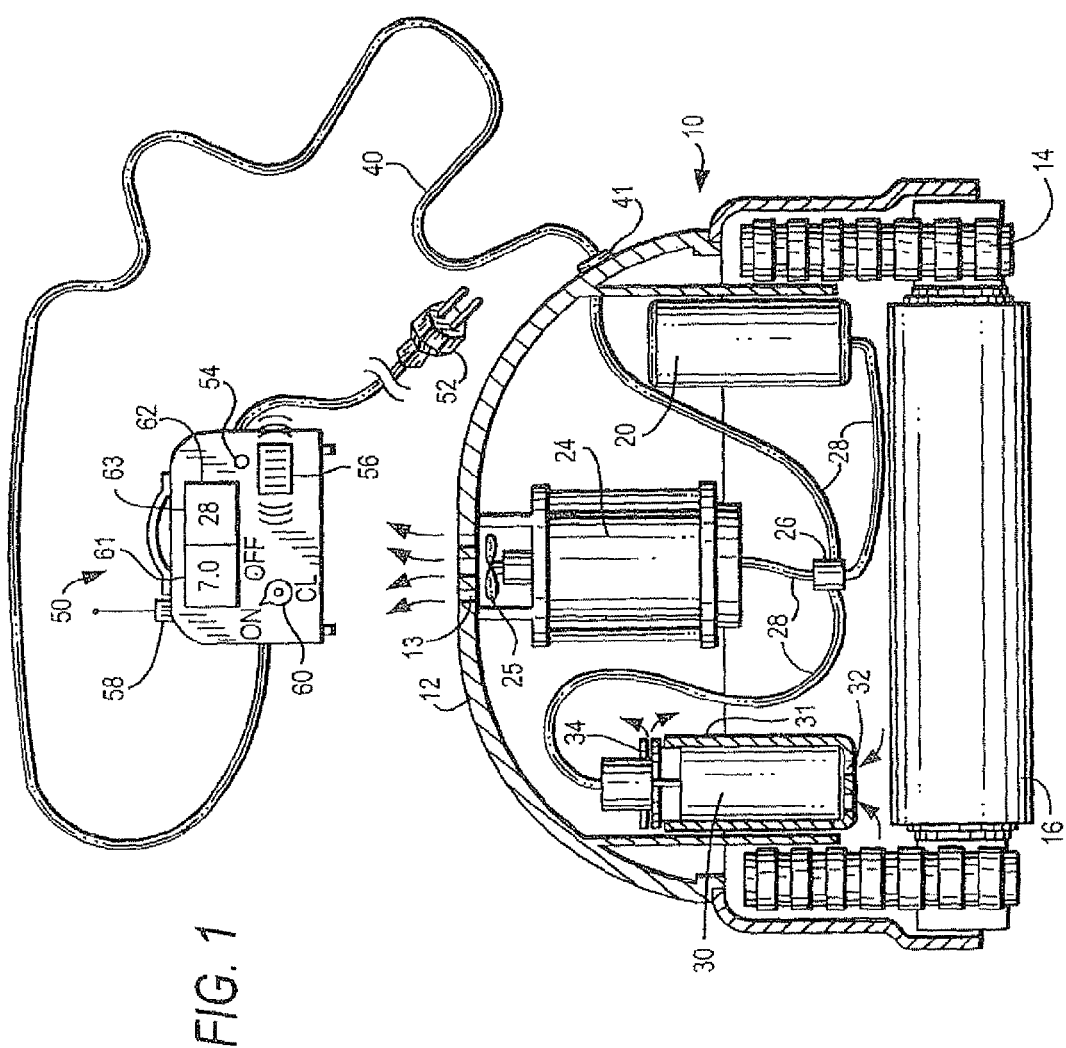
FIG. 1 is a schematic cross-sectional view of one preferred embodiment of the invention in a pool cleaner having an external power supply.

Referring now to FIG. 1, a preferred embodiment of the method and apparatus of the invention will be described in conjunction with a conventional robotic pool cleaner 10 that is electrically connected via cable 40 to remote poolside power supply 50. The principal elements illustrated are the pool cleaner body cover or housing 12, a pair of drive means 14 and a cleaning brush 16, the drive means being powered by drive motor 20. Also mounted in the housing is a conventional pump motor 24 with attached impeller 25 that draws water through a filter element (not shown) and discharges the filtered water through outlet 13 in the housing 12.

In accordance with the invention, also mounted on the interior of the housing is electrochemical chlorine generator 30 having inlets 32 through which salt water passes and, as a result of the electrolysis, generates biocidal chlorine that is dissolved in the water that is discharged through outlets 34. As will be understood by one of ordinary skill in the art, the flow of water through this otherwise conventional pool cleaner housing is through intake openings at the lower portion of the housing and/or base plate and upwardly through a filter where debris is removed and entrained; the water is then discharged through housing outlet 13.

In the preferred embodiment illustrated, an electronic processor/controller in the form of an integrated circuit device 26 is connected by a plurality of conductors 28 to the floating power cable 40 and also to the drive motor 20, pump motor 24 and electrochemical chlorine generator 30.

In the practice of the method, the addition of a sufficient concentration of a chloride-containing chemical compound to the fresh water in the swimming pool provides for the efficient generation of chlorine by the electrochemical generator 30 housed in the moving pool cleaner 10. One readily available and economical form of chloride-containing compound that is convenient to use is sodium chloride, i.e., table salt. Sodium chloride in crystalline form is readily soluble at the required concentrations. In general, the use of natural sea salt which typically contains many other minerals is not desirable for reasons that have been previously described.

The salt can be added to provide a concentration of from about 1,000 parts per million (ppm) to about 7,000 ppm, preferably from 2,000 to 5,000 ppm, and more preferably from 3,000 to 3,500 ppm. For purposes of comparison, human tears contain approximately 3,200 ppm of sodium chloride. This level of salt is well below that of typical sea water and is not found objectionable by the average person using the pool. The amount of table salt added to a 25,000 gallon pool is about 630 pounds. This is the same concentration as used for external in-line chlorinators installed in swimming pool water circulation systems.

In one simplified method of operation of the on-board chlorine generator, the individual responsible for proper maintenance of the water conditions in the pool periodically samples the chlorine concentration manually. If the concentration is below the desired value, the switch 60 on power supply 50 is manually turned to the on position, the effect of which is either to send power directly through a separate wire in cable 40 to the chlorine generator 30 or to transmit a signal to processor/controller 26 causing the electrical power to be routed to generator 30.

Continuing with the description of this first embodiment, after a prescribed time interval, the pool water is again sampled for biocidal chlorine concentration. If the desired level has not been achieved, no action is taken and the pool cleaner continues to move through its programmed cycle and the chlorine generator 30 continues to produce chlorine that is discharged from the pool cleaner housing into the surrounding water and mixed by way of the turbulent action of the pump discharge stream and movement of the cleaner as determined by the program in the processor/controller 26. After a further prescribed interval, the water is again sampled and at such time as the desired concentration of chlorine is reached or exceeded, switch 60 on the power supply is manually turned to the off position thereby turning off the chlorine generator. As this process is repeated on a routine basis, the frequency and duration of the related on-off time intervals will enable the individual responsible for pool maintenance to establish at least an approximate schedule for operating the electrochemical chlorine generator.

In a further preferred embodiment, the processor/controller 26 is programmable by the user to initiate and terminate chlorine generation while the pool cleaner is operating in its customary cleaning mode. As will be understood from the above description, the manual programming of processor/controller 26 will be based upon the experience of the user developed over a suitable period of time, which may be from a few days up to a week. Such adjustments can also be based upon geographical and seasonal conditions and expectations of sunshine, high and low temperatures, daytime exposure to the sun and periods of shade.

A further preferred embodiment will be described with reference to FIG. 1A in which the apparatus of the pool cleaner as described in FIG. 1 is used in conjunction with an automated electronic sampling probe 80. The floating probe 80 can either be tethered to a fixed position or allowed to float about randomly on the surface of the pool. The probe 80 includes a housing 82, sampling port 84 with internal sensor having an electronic ion analyzer (not shown) and is powered by a preferably rechargeable battery 86. A signal corresponding to the periodic analytical results is transmitted via antenna 88 using approved radio frequency (RF) signals. In this embodiment, a floating probe is illustrated, but the probe can be permanently attached to a wall of the pool.

In an alternate preferred embodiment described in more detail below, the same type of sensor having an electronic ion analyzer that is contained in probe 80 can be located inside of, or attached to or projects from the exterior of the pool cleaner housing 12. In this embodiment, the sensor and analyzer form an integral functional component of the pool cleaner that periodically measures the chlorine concentration in the pool water. The probe sensor is preferably located upstream of cell 30 in order to test the condition of the water drawn into the housing from below housing 12.

In the embodiment illustrated, the power supply 50 conveniently includes a receiver attached to antenna 58 and a relay transmitter for communicating the signal to either a processor contained in the housing of power supply 50 or to the on-board processor/controller 26. Systems and methods for communicating the land-based signal to the submerged on-board processor/controller 26 are known and will not be described in detail here.

When the signal from probe 80 indicates a concentration below the desired value, the relay transmitter in power supply 50 sends an appropriate signal to maintain the operation of the chlorine generator 30 on the pool cleaner. Alternatively, if the probe signal corresponds to an acceptable concentration of chlorine in the pool water, the relay transmitter signals the controller/processor 26 to discontinue supplying power to the generator 30.

As will be understood by one of ordinary skill in the art, the relay receiver and relay transmitter can be incorporated in a separate housing and provided with a separate source of power. Other functions and systems described below can also be included in this separate unit.

In the event that the pool cleaner completes its cleaning cycle before the desired concentration of chlorine has been achieved, the controller/processor continues to direct the movement of the pool cleaner. Similarly, if the chlorine level has been achieved and the pool cleaner has completed its cleaning pattern, the power to the pool cleaner functional elements, e.g., pump, drive motor and chlorine generator, is discontinued. Should the probe 80 signal a need for further chlorine generation while the pool cleaner is in the off mode, a signal is sent to the controller/processor 26 to initiate the movement of the pool cleaner and activation of the pump and the chlorine generator. In this manner, chlorine is distributed by the movement of the pool cleaner throughout the body of water in which it is moving.

In a further preferred embodiment of the control system of the invention illustrated in FIG. 1, the relay transmitter located in power supply unit 50 includes a visual display alarm 54, which can be a flashing light source, and/or an audible alarm 56. The alarms are programmed to function when the chlorine concentration as determined by the signal from probe 80 exceeds a prescribed value. The alarms can also be programmed to function if the chlorine concentration has been below a predetermined minimum acceptable value for a predetermined time interval, thereby indicating that the electrochemical generator is not functioning properly and that remedial action is required by maintenance personnel.

With continuing reference to the power supply unit 50, a visual display panel 62, e.g., an LED display, is provided to indicate the numeric values of the water qualities as determined by the probe 80. The panel display 62 preferably includes a separate display 61 for pH and a display 63 for chlorine concentration. Alternatively, a single LED panel can display one, or a plurality of values in a pre-programmed or manually selected sequence.

Figure 2:
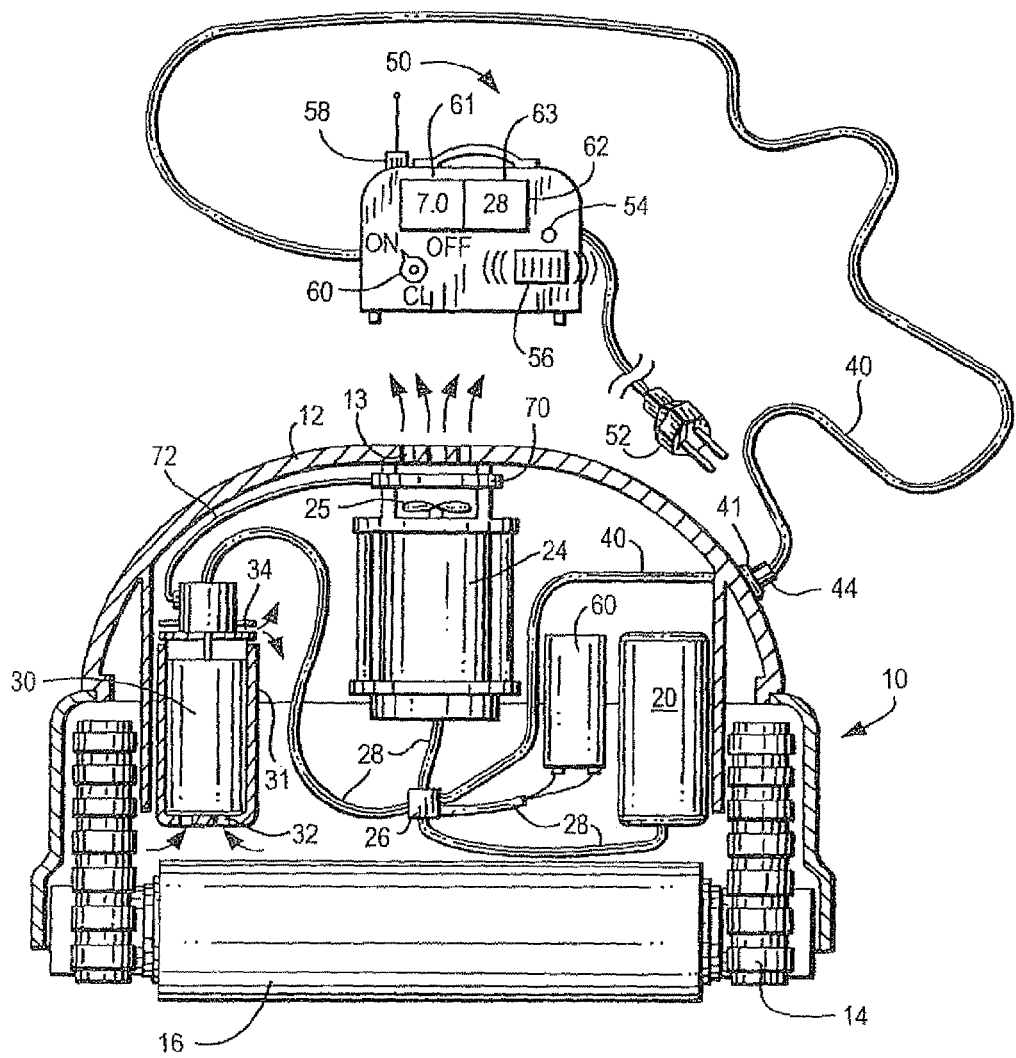
FIG. 2 is a schematic cross-sectional view of an alternative preferred embodiment in which the pool cleaner has an on-board battery and a water turbine power source for the chlorine generator suitable for use in the invention.

Referring to now FIG. 2, the principal difference between this embodiment and the pool cleaner illustrated in FIG. 1 is the substitution of an on-board battery 60 for the power supply and the installation of a dynamo 70 between the pump impellor 25 and the water outlet 13 in housing 12. As will be understood from the illustration, the stream of rapidly flowing water discharged by the pump impellor 25 rotates the blades of the dynamo 70 thereby generating electricity that is delivered to the chlorine generator 30. The energy requirements of the generator 30 can also be supplied by the battery, if necessary, via conductor 72. In a further alternative embodiment, as shown, the pool cleaner is also equipped with a power cable 40, as in the embodiment of FIG. 1, which can provide power to meet operational requirements that exceed the capacity of the battery and/or dynamo, or to recharge the battery. In this embodiment, the power cable 40 can include a plug received in a socket located at 41 in the housing 12. An inductive charging system such as that disclosed in U.S. Pat. No. 6,842,931 can also be employed.

Referring now to FIGS. 3 and 4, there is illustrated an electrolytic cell 100 suitable for use in the on-board electrochemical generator 30 to generate chlorine during operation. In this embodiment, the cell consists of five titanium plates with a coating of mixed metal oxides of titanium, ruthenium and iridium measuring approximately 60×80 mm and maintained in spaced relation by nylon fasteners 104, e.g., threaded bolts and nuts, and insulative spacers 106. One or more threaded mounting and terminal bolts 108 are attached to conductor bracket 110 for receiving and applying a positive charge to the two exterior and one central plate labeled "P". Conductor bracket 112 delivers an opposing negative charge to the intermediate plates labeled "N". The plates are approximately 1 mm thick with a gap of 1.5 mm.

The cell 100 is conveniently placed in a non-conductive, corrosion-resistant polymer casing 31 as shown, e.g., in FIG. 1, for secure, but removable mounting on the interior of the pool cleaner housing 12. The case 31 is preferably cast polycarbonate, but can also be made from ABS or PVC or other suitable polymers. Terminals 108 are fitted with electrical conductors 28 secured by brass nuts and epoxy to provide the required voltage and amps from the power supply.

In one preferred embodiment, the cell can be configured for operation at a production rate of about 8 grams of sodium hypochlorite/hour. The water containing the generated chlorine must be moved away from the generator and circulated for mixing with the pool water in order to avoid damage to the cell. Although short periods of interrupted water movement can be tolerated, if the water circulation through and around the cell ceases for more than a short time, the concentration of generated chlorine can reach a level that has the potential to damage the cell and adversely affect its operation.

Figure 5:
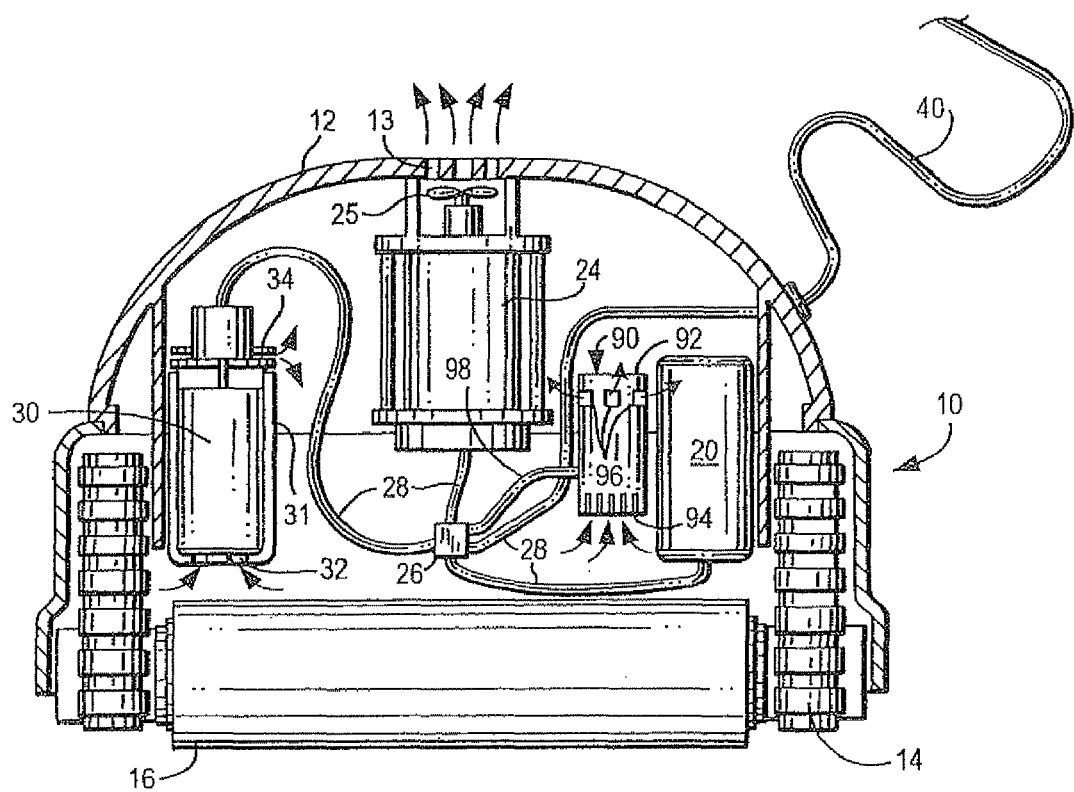
FIG. 5 is a schematic cross-sectional view of an alternative preferred embodiment in which the pool cleaner has an integral chlorine monitoring system mounted inside the housing.

Another preferred embodiment will be described with reference to FIG. 5 in which a chlorine monitoring system 90 is conveniently mounted inside the pool cleaner to form an integral part of the apparatus. The chlorine monitoring system 90 includes a housing 92, sampling inlet ports 94 and outlet ports 96 and contains internal analyzing and data collecting, storage, processing and transmission capabilities (not shown), and is powered via connection 28 to a power supply. The chlorine monitoring system 90 periodically measures the free chlorine which is preferably maintained at two (2) parts per million (ppm) concentration in the pool water. The generated signal corresponding to the periodic analytical results is transmitted via line 98 to the computer processor of the controller of the pool cleaner and used as the feedback for control of the on-board electrochemical chlorine generator 30. The production of chlorine can be controlled to automatically maintain a constant residual chlorine level in the pool water, e.g., by comparing the feedback signal to a predetermined value to turn the on-board chlorine generator 30 on or off as required.

Alternate modes of operation of the pool cleaner with the chlorine generator of the present invention will be described with reference to the schematic illustrations of FIGS. 6 and 7. In both figures, the upper time line represents the operating sequence of the pump and the lower time line operation of the chlorine generator. The lower horizontal baseline in each sequence represents the "power off" or deactivated condition for the functional element.

Figure 6:
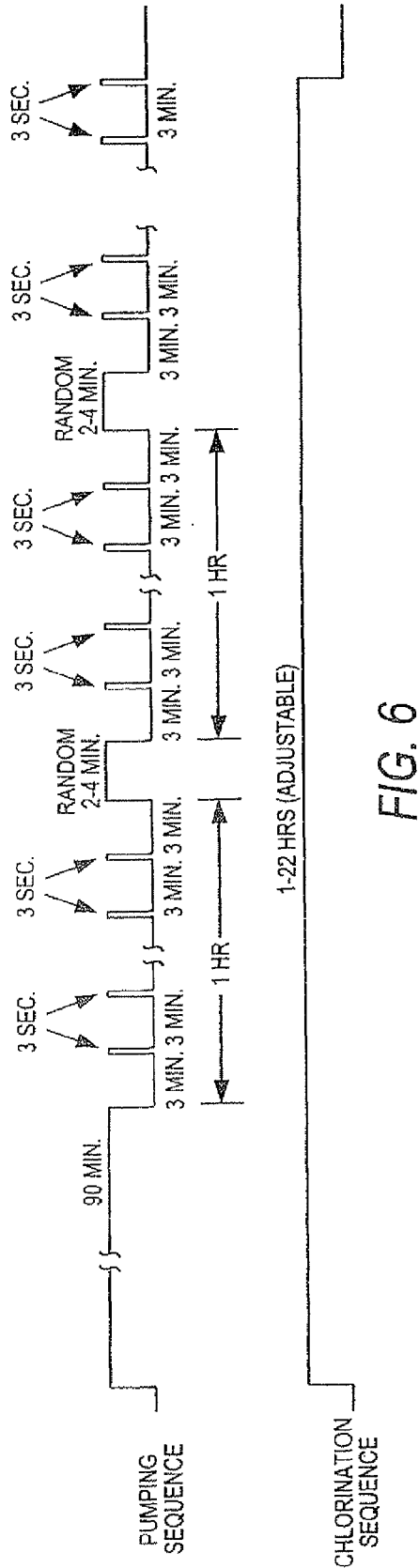
FIG. 6 is a schematic illustration of one mode of operating a pool cleaner in accordance with the invention.

Referring now to FIG. 6, it will be seen that the initial pumping sequence is, for this illustrative example, 90 minutes which represents the pre-programmed cleaning cycle. At the conclusion of the cleaning cycle, the pump is deactivated for approximately 3 minutes and then activated for approximately 3 seconds, and this cycle is repeated for a predetermined duration of time, for example, one hour. During the next time period of from 2 to 4 minutes, identified as "random" on the illustration, both the pump and the drive means are activated to move the pool cleaner to a different position on the bottom of the pool. As used here, the term "random" is used as shorthand for "random movement". Thereafter, the pump is stopped for about 3 minutes and then started for about 3 seconds, and this cycle is again repeated for about one hour. This mode of operation continues for any desired predetermined period of time, which for the purpose of illustration in FIG. 6 is indicated to be up to 22 hours.

Referring to the lower timeline in FIG. 6, it will be seen that the chlorine generator is operated throughout the entire cleaning cycle and during the pump pulsing cycles and the random movement cycles. This continuous chlorine generation operational mode is contemplated for use at a time when the biocidal chlorine level in the pool water is low, or when the environmental conditions are such that the desired predetermined level has not been achieved or maintained.

As will be understood from the example of FIG. 6, the pulsing operation of the pump for only 3 seconds following 3 minute "power off" intervals results in operating the pump for only about one minute during that one hour cycle. Thereafter, the pump operates from 2-4 minutes every hour over an extended period e.g., 22 hours, during which the pump would be operating for from less than 50 minutes to about 90 minutes. As will be appreciated by one of ordinary skill in the art, this level of usage will not adversely affect the useful life of the pump motor and will provide a means of distributing bactericidal chlorine throughout the body of water in the swimming pool without the need for auxiliary sanitizing means, whether chemical or a large in-line chlorination unit which requires operation of the pool's main water circulation pump having substantially higher electric power consumption with its attendant expense.

Figure 7:
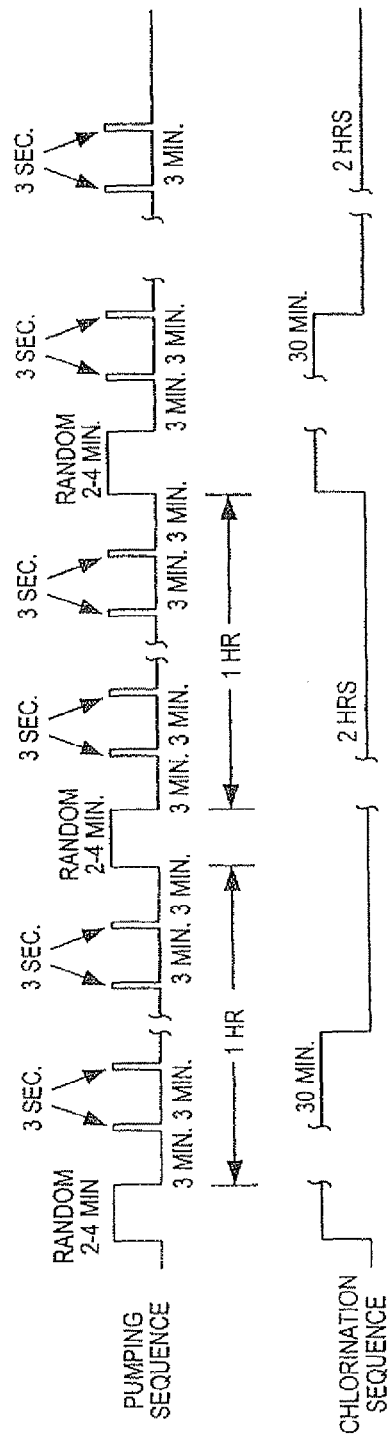
FIG. 7 is a schematic illustration of another mode of operating a pool cleaner in accordance with the invention.

Referring now to FIG. 7, a mode of operation that is adapted for use in maintaining a predetermined level of chlorine concentration is illustrated. This will also be referred to as a secondary mode of operation. In this embodiment, it is assumed that the desired chlorine level has been achieved and that it can be maintained by the programmed operation of the chlorine generator at less than full-time, e.g., for about 30 minutes followed by an interval of about 2 hours during which the generator 30 is not powered. The pump operating sequence timeline is similar to that of FIG. 6 between cleaning cycles. That is to say, the pump is operated for about 3 seconds following 3 minute intervals over the course of about an hour and thereafter, the pump and drive means are activated for a period ranging from 2 to 4 minutes. This mode of operation also relocates the pool cleaner at one hour intervals to continue the movement or circulation of water, but anticipates that the level of chlorine can be maintained without the continuous operation as taught in FIG. 6.

The mode of operation of FIG. 7 can be advantageously utilized during the evening hours when the sun is no longer on the pool, when the water temperature drops, and/or when the evaporative effect caused by the sun, high temperature and/or the wind have been reduced.

In a particularly preferred embodiment, the pumping and operational sequences of FIG. 7 are combined with the operation of FIG. 6. This combination can be achieved automatically by including a chlorine sensor which provides a signal to the controller when the chlorine level in the pool water is within a predetermined desired concentration. In that instance, the controller moves from the primary program illustrated in FIG. 6 to the secondary maintenance program of FIG. 7. As will be apparent from the example of FIG. 7, the power consumed by the pool cleaner will be reduced as the duration of operation of the chlorine generator 30 is reduced.

Even more important from the standpoint of power conservation is the relatively smaller amount of energy required to continuously operate a pool cleaner as the sole means of water circulation and sanitizing as compared to an in-line pumping system and chlorinator which, as described above, requires operation of the pool's main water circulation pumping system.

The method and apparatus of the present invention will also be more economical to operate than the device disclosed in U.S. Pat. No. 5,882,512 (Denkewicz, et al.) discussed above because it requires no expenditure for expensive sanitizing chemicals that must continuously be replaced. The table salt used in applicant's process is initially inexpensive and thereafter does not require replenishment because it is not consumed.

Furthermore, the apparatus of the Denkewicz patent incorporates a relatively complex mechanical system for dispensing a granular chemical compound and must be removed from the pool to be refilled with new chemical. In contrast, applicant's apparatus has no moving parts in addition to those of a conventional pool cleaner and can operate continuously, if desired, over long periods of time.

It will be understood, that the capability of a single pool cleaner operated in accordance with the invention to adequately treat and maintain a pool of a particular size must be determined under specific environmental or climactic conditions. For example, a relatively small indoor pool as is often found in a hotel, health club, residential or apartment units are not subject to high winds, extreme variations in temperature and significance sun loads. Thus, once the operating parameters have been established for the environment, the programmable elements of the pool cleaner controller can be adjusted, preferably by the user, to consistently meet the predetermined desired level of chlorine.

Referring now to FIG. 8, a preferred embodiment of the invention in which the chlorine generator is adapted for ease of removal and replacement will be described. For the purpose of this portion of the description, it will be understood the elements correspond to case 31 illustrated in FIGS. 1, 2 and 5. The cell 30 is secured in a supporting housing or case 131 that is comprised of four side walls 122 that allow the passage of water through its open ends and over the cell plates 102, as described in connection with FIG. 3. It will also be understood that the cell plates are fitted with positive and negative conductors, or plugs, that engage corresponding receptacles or receivers for the plugs that are secured to the interior structure of the pool cleaner housing or frame members for providing power to the cell during operation.

At least one cell mounting member, referred to generally as 124, is affixed to one of the side walls 122. Mounting member 124 is constructed to releaseably engage mounting bracket 140 that is secured, for example, to supporting frame member 150 that forms part of the interior structure of the pool cleaner 10.

In the illustrative embodiment of FIGS. 8 and 9, mounting member 124 is comprised of T-shaped flange member 126 that projects from, and extends along one of the walls 122. Mounting bracket 140 includes an elongated recessed portion 142 having projecting arms 144 that terminate in opposing fingers 146 that are spaced apart to receive the T-shaped member 124 in a close-fitting and secure relation.

A releasable closure 160 is bias-mounted for movement from a normally locked position in which it engages the end of T-shaped member 124 and thereby retains the cell in position in bracket 140. The biased member can be constructed by integrally molding a living hinge element 162 to an end portion of an interior wall. In the embodiment illustrated, the opposing faces of the cross-member of the T-mount and the fingers 146 are provided with projecting ridges 128, 148, respectively that mate with corresponding valleys to provide a secure interlocking fit.

In an alternate embodiment (not shown), the mounting member 124 and the mounting bracket 140 are constructed without ridges 128, 148, but with close-fitting tolerances, and optionally with tapered contacting surfaces, so that when the T-shaped member is manually inserted into recessed portion 142, a secure friction fit is achieved. In this embodiment, the bias-mounted closure member 160 is also optional. Additional manually operable positive locking devices of the prior art can also be utilized to assure that the case with the cell will not be dislodged unintentionally.

With continuing reference to FIGS. 8 and 9, a new or repaired cell and case assembly is installed in operational position by moving locking member 150 against its biasing force to open the passage formed by the arms 146 of bracketed 140 and inserting the T-shaped member 126 and sliding the case to its final position. Releasing the locking member 160 secures the replacement mounting member and case assembly in operating position. As will be apparent to one of ordinary skill in the art, the leading edge of locking member 160 can be beveled or otherwise chamfered to facilitate its lateral movement in response to the force of the end of the T-shaped member 126 during its insertion into bracket 140. The upper surface of locking member 160 can also be provided with a projecting flange or other element 164 to facilitate manual engagement for movement by a finger or thumb.

In the particular embodiment illustrated, the interior surface of the top of T-shaped member 126 is provided with a plurality of spaced-apart projecting ribs 128. The mounting bracket 140 is provided with a plurality of spaced-apart fingers 146 that are configured to receive the ribs 128 when the mounting member 120 is properly seated and locked in the bracket 140 as illustrated in FIG. 9. In this embodiment, locking member 150 is mounted on, or integrally formed with plate 154 that is also biased to engage the upper surface of the top of the T-shaped member 120 and urge its ribs 128 into position between the fingers 146. This arrangement minimizes the opportunity for any relative movement between the mounting members 120 and mounting bracket 140, e.g., in the event that the pool cleaner is inadvertently dropped on a hard surface, or otherwise subjected to an external impact or vibrational forces.

As will also be apparent, the cell can be configured and assembled as an integral portion of the removable case so that the entire unitary structure would be replaced in the event of a failure of the cell. Alternatively, the cell can be constructed so that it can be removed from the protective case and the case reused to receive a new or refurbished cell.

As will be apparent to those of ordinary skill in the mechanical arts, any of a wide variety of secure releasable engagement means can be employed to removably retain the chlorine cell in position and still achieve the desired purpose and intent of the invention to enable the untrained user to easily and safely remove and reinstall the cell.

The elements described above are preferably fabricated from electrically non-conductive, corrosion impervious and impact-resistant materials. Various polymers, copolymers and filled polymeric materials known to those of ordinary skill in the art can be used. The various parts can be molded in unitary assemblies or machined as separate elements and assembled. Alternatively, parts of metal and metal alloys can be spray-coated with powdered polymers to provide the desired level of corrosion resistance.

Figure 10:
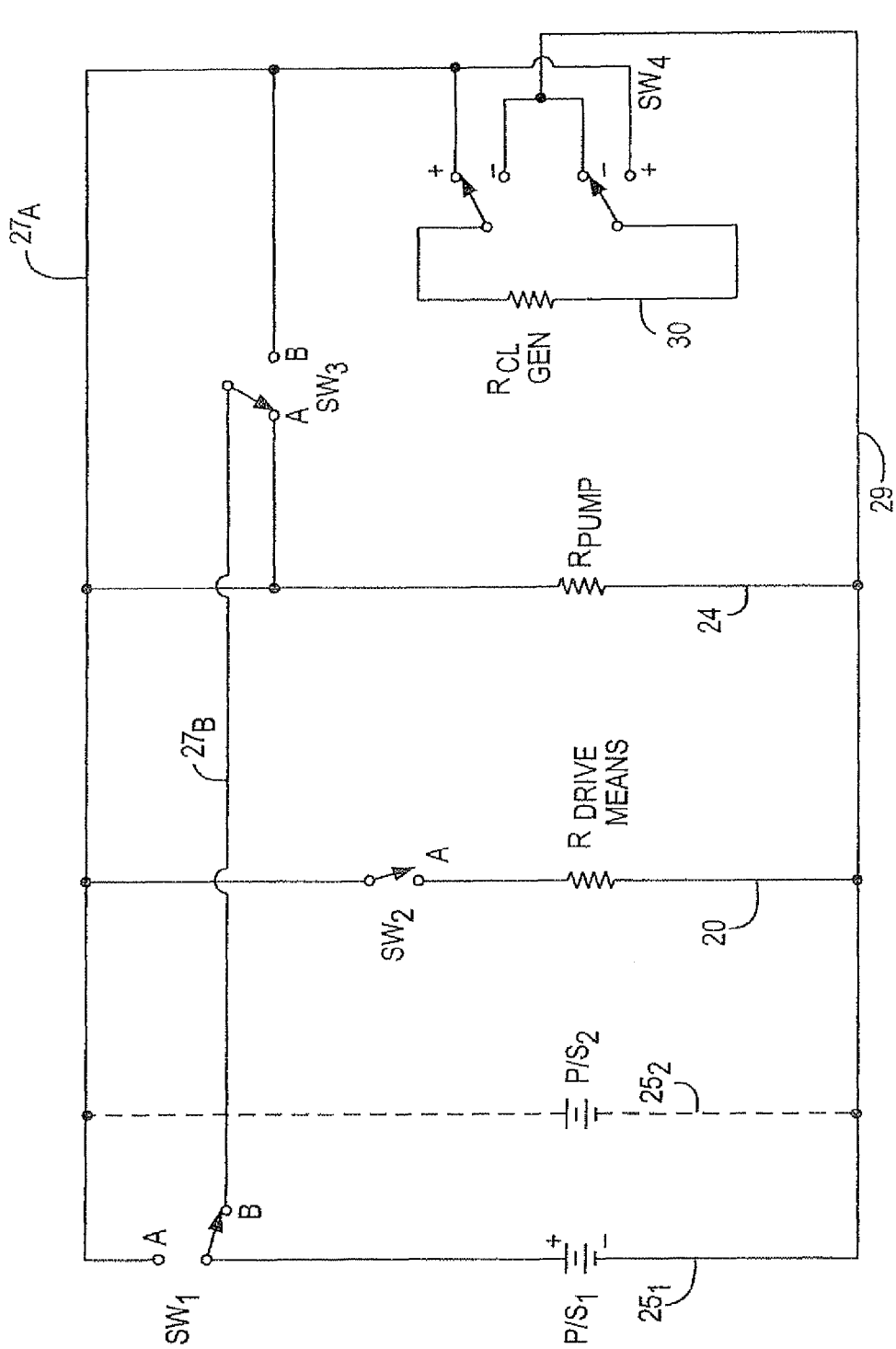
FIG. 10 is a schematic diagram of one embodiment of a portion of the electrical control system for operating the drive means, water pump and electrochemical generator in accordance with the invention.

Referring now to the circuit diagram 200 of FIG. 10, the components of the robotic pool cleaner can be powered by one or more internal rechargeable batteries 25 as described generally in FIG. 2, as an alternative to an external power supply 50 shown in FIG. 1. In one embodiment, a single power supply battery $25_1$ is coupled in parallel with the drive means, e.g., drive motor 20, the pump 24 and the chlorine generator 30, each of which are illustratively represented as resistive loads in FIG. 10. One of ordinary skill in the art will appreciate that one or more step-up or step-down transformers (not shown) can be provided in series between the power supply $25_1$ and one or more of these three components to respectively increase or decrease the power requirements as necessary.

With continuing reference to FIG. 10, a plurality of switches, such as relays $SW_1$, $SW_2$, $SW_3$, and $SW_4$ are illustratively provided to control the power directed to each of the components to enable one or more of the components to operate independently or contemporaneously with the others. Switches $SW_1$, $SW_2$, $SW_3$ are illustratively single pole-single throw (SPST) switches, while switch $SW_4$ is a double pole-double throw (DPDT) switch. The settings of the switches control power from the power supply 25 to each component, and hence the operation of the robotic pool cleaner. The controller 26 provides signals to relays in a conventional manner to set the contact positions of the switches $SW_1$, $SW_2$, $SW_3$, and $SW_4$. The contact settings are based on the timed cleaning cycles of the one or more programs stored in the memory of the controller 26.

As shown in FIG. 10, switch $SW_1$ controls power between a first positive terminal "A" $27_A$ and a second positive terminal "B" $27_B$. Switch $SW_2$ is serially coupled between positive terminal "A" $27_A$ and the drive means 20. Switch $SW_3$ is serially coupled between the second positive terminal "B" $27_B$ and the pump 24 and the chlorine generator to alternately provide power to one of these components. Switch $SW_4$ has a first end coupled to the first positive terminal "A" $27_A$ and the second positive terminal "B" $27_B$, and a second end coupled to the negative terminal 29 of the battery $25_1$, or P/$S_1$. Switch $SW_4$ enables the current through the chlorine generator 30 to be reversed by reversing the polarity of the current flowing from the battery terminals to the generator 30.

During operation, when the cleaner is programmed to generate biocidal chlorine while executing the programmed cleaning pattern, the power must be provided simultaneously to the drive means 20, the pump 24 and the generator 30. In this instance, switch $SW_1$ is set to contact "A", i.e., the first positive terminal $27_A$, to provide power to the chlorine generator 30, $SW_2$ is closed to provide power from the battery $25_1$ to the drive means 20, and switch $SW_3$ is set to contact A to provide power from the battery $25_1$ to the pump 24.

Alternatively, if biocidal chlorine is to be generated while the robotic cleaner is stationary in the pool, then power from the battery is provided only to the pump 24 and chlorine generator 30. In this instance, switch $SW_2$ is opened by the controller 26 to prevent power to the drive means 24, while switch $SW_1$ remains set to the first positive terminal $27_A$ and switch $SW_3$ remains set to contact A to provide power to the pump 24. In this condition, the cleaner remains stationary at the bottom of the pool, continues to generate chlorine and pumps water to avoid depletion of the saltwater proximate the cells of the generator 30, as described above.

In yet another mode of operation, the robotic cleaner can be programmed to remain stationary on the bottom of the pool and generate chlorine without the pump being operational. In this embodiment, the controller 26 sets switch $SW_1$ to the second positive terminal $27_B$ thereby decoupling power to the drive motor 24. Switch $SW_3$ can be switched to contact "B" to provide power only to the chlorine generator 30 to enable production of the chlorine ions. Alternatively, switch $SW_3$ can be moved to contact "A" to provide power only to the pump 24. In this manner, the pump 24 can be turned on without the other two components to help remove scaling, as described above. It is noted that a person of ordinary skill in the art for which the invention pertains will understand that the switches identified as $SW_1$ through $SW_3$ can also be configured to control power on the negative terminal 29. For example, switch $SW_2$ can be positioned between the drive motor 20 and the negative terminal 29.

Further, a second power supply $25_2$, or P/$S_2$, shown in phantom, can be implemented to provide power, for example, to the drive means 30 and/or pump 24, while the first power supply $25_1$ provides current to the chlorine generator 30. Alternatively, the second power supply $25_2$ can be used to provide power only to the drive means 30, while the first power supply $25_1$ provides power to the pump 24 and/or chlorine generator 30.

The circuitry 200 of FIG. 10 is provided for illustrative purposes and should not be construed as limiting. Accordingly, the switching circuitry of the present invention enables the robotic cleaner to perform Gleaning and anti-bacterial cleansing operations either independently or contemporaneously. Further, a single power source can be used to operate the robotic cleaner during each mode of operation, and thereby eliminate the need for additional batteries which can be costly to install and require additional space in the cleaner housing.

While various illustrative embodiments have been described in detail, further modifications and variations in the apparatus, system and method of the invention will be apparent to those of ordinary skill in the art. The full range and scope of the invention, and its equivalents, is therefore to be determined with reference to the claims that follow.

The invention claimed is:

1. An automated self-propelled pool cleaner having a housing, a pump for moving water through the housing, drive means for moving the pool cleaner over at least the bottom wall of a pool; an integral electrochemical chlorine generator positioned in said housing for producing bactericidal chlorine, the electrochemical chlorine generator comprising a plurality of negative and positive conductive plates arranged in a parallel spaced-part array to form a plurality of passageways, the array being positioned in the flow path of water moving through the housing; an outlet for discharging water containing bactericidal chlorine produced by the electrochemical chlorine generator into the water proximate the exterior of the pool cleaner housing; a source of electrical power operatively connected to the electrochemical chlorine generator; and programmable control means for initiating and terminating the operation of the chlorine generator, the pump and the drive means, the control means programmed for:
  a. activate the pump and the drive means to thereby move the pool cleaner across the surface of a wall of the pool to perform a programmed cleaning cycle;
  b. initiate the operation of the electrochemical chlorine generator to thereby produce bactericidal chlorine from a chlorine-containing compound dissolved in the water during the cleaning cycle;
  c. discharge bactericidal chlorine-containing water from the pool cleaner housing in a turbulent flow to mix with the water in the pool;
  d. deactivate the drive means and the pump at the end of the cleaning cycle while maintaining the operation of the electrochemical chlorine generator;
  e. activate the pump for intervals of several seconds every several minutes following the end of the cleaning cycle for a period of about one hour;
  f. activate the drive means and the pump for a period of time ranging from 2 to 4 minutes to thereby relocate the pool cleaner in the pool;
  g. activate the pump for intervals of several seconds every several minutes after the pool cleaner is relocated; and
  h. repeat steps (f) and (g) for a predetermined period of time.

2. The pool cleaner of claim 1 in which the pump is inside the housing or external to the pool.

3. The pool cleaner of claim 1, wherein the source of electrical power is a remote power supply and an electric cable is connected to the electrochemical chlorine generator in the interior of the housing.

4. The pool cleaner of claim 3, wherein the control means includes a switch on the remote power supply and the switch is manually or electronically activated.

5. The pool cleaner of claim 3, wherein the programmable control means is remote from the pool cleaner and is operatively connected to the power supply and the electric cable includes conductors connected to the pump and the drive means.

6. The pool cleaner of claim 1, wherein the control means includes a controller operatively connected to a signal receiver, whereby a control signal received from a remote relay transmitter is processed to initiate and terminate the operation of the electrochemical chlorine generator in response to information corresponding to the concentration of bactericidal chlorine in the pool water.

7. The pool cleaner of claim 6 that includes an electronic probe in contact with the pool water for determining the concentration of bactericidal chlorine and transmitting a signal to the relay transmitter for processing and transmission of an appropriate control signal to the controller.

8. The pool cleaner of claim 6, wherein the signal receiver is an antenna extending from the controller to the surface of the pool water.

9. The pool cleaner of claim 6 in which the controller is programmed to institute a secondary electrochemical generator operating program when a predetermined level of chlorine is signaled, the secondary operating program including steps for:
  a. activating the electrochemical chlorine generator to operate for a period of 30 minutes every 2 hours;
  b. activating the drive means and the pump for a period of time ranging from 2 to 4 minutes at internals of about one hour to thereby relocate the pool cleaner in the pool; and
  c. activating the pump after the pool cleaner is relocated for intervals of several seconds every several minutes for a period of about one hour.

10. The pool cleaner of claim 1 that includes a chlorine monitoring system mounted inside the pool cleaner or attached to the exterior of the pool cleaner housing, the monitoring system generating electrical signals corresponding to the concentration of bactericidal chlorine in the pool water, which signals are transmitted as feedback through wire connections to the control means to thereby initiate and terminate the operation of the electrochemical chlorine generator, whereby the concentration of bactericidal chlorine in the pool water is maintained in a predetermined range.

11. An automated system for establishing and maintaining a predetermined concentration of bactericidal chlorine in a swimming pool, the system comprising:
  a. an automated self-propelled pool cleaner having a housing, a pump for moving water through the housing, drive means for moving the pool cleaner over the surface of the pool to be cleaned, an integral electrochemical chlorine generator mounted in the housing, the electrochemical chlorine generator comprising a plurality of negative and positive conductive plates arranged in a parallel spaced-apart array to form a plurality of passageways, the array being positioned in the flow path of water moving through the housing;
  b. a source of electrical power operatively connected to the electrochemical chlorine generator;
  c. programmed control means for initiating and terminating the functioning of the electrochemical chlorine generator, the pump and the drive means, wherein the control means are programmed (i) to activate the electrochemical chlorine generator to operate for a period of thirty minutes every two hours, and (ii) to activate the drive means and the pump for a period of time ranging from 2 to 4 minutes to thereby relocate the pool cleaner in the pool at intervals of about one hour, and (iii) to activate the pump for intervals of several seconds every several minutes for a period of about one hour after the pool cleaner is relocated.

12. The system of claim 11, wherein the source of electrical power includes at least one on-board battery and at least one relay which directs power from the at least one battery to the water pump, drive means and chlorine generator, the at least one relay being operable in response to signals received from the controller.

13. The system of claim 12 which includes two batteries.

* * * * *